United States Patent [19]
Lowry et al.

[11] Patent Number: 5,752,293
[45] Date of Patent: May 19, 1998

[54] HINGE ASSEMBLY

[75] Inventors: David A. Lowry, Wayne; Yevgeny Novikov, Norristown, both of Pa.

[73] Assignee: CEMA Technologies, Inc., Bridgeport, Pa.

[21] Appl. No.: 563,326

[22] Filed: Nov. 28, 1995

Related U.S. Application Data

[63] Continuation of Ser. No. 071,807, Jun. 2, 1993, Pat. No. 5,491,874.

[51] Int. Cl.$^6$ ...................................................... E05D 11/08
[52] U.S. Cl. ................................................. 16/342; 16/337
[58] Field of Search .......................... 16/342, 319, 337, 16/297, 343, 347

[56] References Cited

U.S. PATENT DOCUMENTS

| | | |
|---|---|---|
| 1,433,095 | 10/1922 | Peary . |
| 2,462,304 | 2/1949 | Burdick . |
| 2,504,351 | 4/1950 | Ring . |
| 3,035,864 | 5/1962 | Davidson . |
| 3,181,197 | 5/1965 | Sperber . |
| 3,188,685 | 6/1965 | Fletcher . |
| 3,359,685 | 12/1967 | Hodgen . |
| 3,474,470 | 10/1969 | Watson . |
| 4,377,019 | 3/1983 | Takahashi . |
| 4,428,095 | 1/1984 | Takahashi . |
| 4,489,447 | 12/1984 | Umehara . |
| 4,506,408 | 3/1985 | Brown . |
| 4,528,718 | 7/1985 | Brockhaus . |
| 4,630,333 | 12/1986 | Vickers . |
| 4,639,147 | 1/1987 | Schwarz . |
| 4,916,926 | 4/1990 | Shieh . |
| 4,964,193 | 10/1990 | Rommelfaenger, et al. . |
| 5,018,244 | 5/1991 | Hino . |
| 5,052,078 | 10/1991 | Hosoi . |
| 5,079,799 | 1/1992 | Rude, et al. . |
| 5,142,738 | 9/1992 | Ojima . |
| 5,165,145 | 11/1992 | Sherman . |

FOREIGN PATENT DOCUMENTS

| | | |
|---|---|---|
| 2414110 | 8/1979 | France . |
| 4132567 | 4/1992 | Germany . |
| 4132568 | 5/1992 | Germany . |
| 4133741 | 5/1992 | Germany . |
| 4138314 | 6/1992 | Germany . |
| 4138316 | 7/1992 | Germany . |
| 7104049 | 9/1971 | Netherlands . |
| 0342538 | 2/1931 | United Kingdom . |
| 2247913 | 3/1992 | United Kingdom . |

*Primary Examiner*—Chuck Mah
*Attorney, Agent, or Firm*—Panitch; Schwarze; Jacobs & Nadel, P.C.

[57] ABSTRACT

A hinge assembly for rotatably coupling a first member to a second member which includes a friction element for being secured to the first member. The friction element has an internal surface defining a generally cylindrical cavity. The friction element is geometrically configured to have substantially uniform strength. A generally cylindrical pintle for being secured to the second member includes an external surface and is positioned within the cavity with the external surface of the pintle being in facing frictional engagement with the internal surface of the friction element. As such, substantially uniform forces are created between the external surface of the pintle and the internal surface of the friction element to provide torque transfer and angular positional control of the pintle with respect to the friction element.

28 Claims, 4 Drawing Sheets

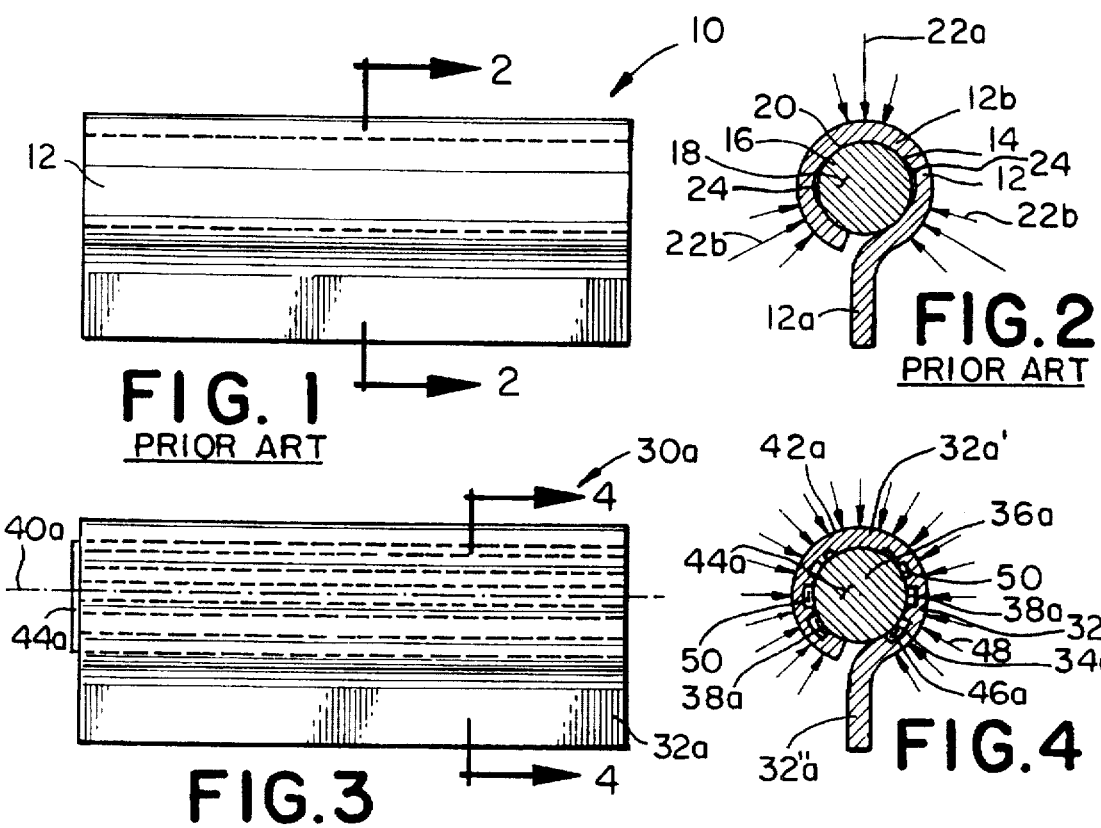
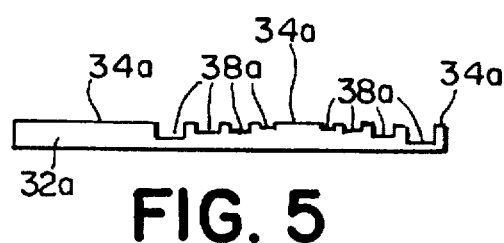
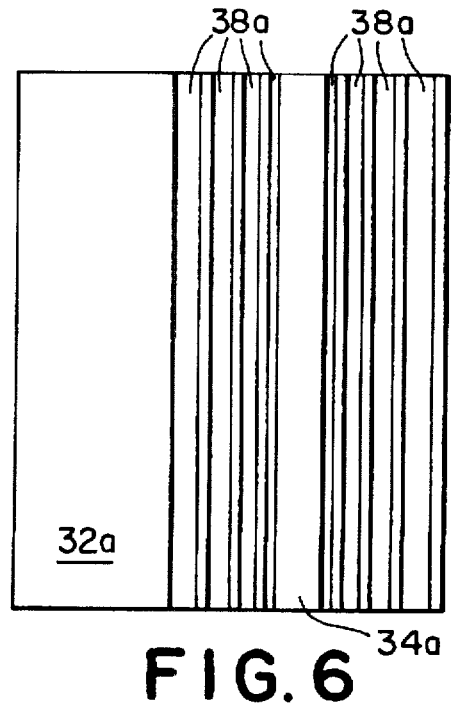

5,752,293

1

HINGE ASSEMBLY

CROSS REFERENCE TO RELATED APPLICATIONS

This application is a continuation of U.S. application Ser. No. 08/071,807, filed on Jun. 2, 1993, now U.S. Pat. No. 5,491,874.

FIELD OF THE INVENTION

The present invention relates generally to a hinge assembly for rotatably coupling a first member to a second member and, more particularly, to a hinge assembly having a friction element which controls the angular position of the first member with respect to the second member.

BACKGROUND OF THE INVENTION

In the hinge field it is often necessary to control the angular position of a first member which is rotatably coupled to a second member by the hinge. A common application of such a hinge would be in laptop, notebook, and palmtop computers to allow a user to position the liquid crystal display screen. In a notebook computer, for example, the hinge housing is normally structurally fastened to the base of the computer and the shaft is connected to the screen of the computer. When the screen is rotated, it is held in any angular position by the torque generated between the friction elements in the hinge and the shaft.

Referring to FIGS. 1 and 2, there is shown a prior art hinge assembly, generally designated 10, for rotatably coupling a first member (not shown) to a second member (not shown). An example of the first and second members includes the base and screen, respectively, of the notebook computer mentioned above. However, the first and second members can be any members wherein it is desired to control the angular position of one member with respect to the other.

The hinge assembly 10 includes a friction element 12 for being secured to the first member. The friction element 12 is generally in the form of a question mark in cross section. That is, the friction element 12 includes a barrel or knuckle portion 12a and a leg or leaf 12b extending therefrom for being connected to the first member. The barrel 12a of the friction element includes an internal surface 14 which defines a generally cylindrical cavity 16.

The hinge assembly further includes a generally cylindrical pintle 18 for being secured to the second member. The pintle 18 includes an external surface 20. The pintle 18 is positioned within the cavity 16 with the external surface 20 of the pintle 18 in frictional engagement with a portion of the internal surface 14 of the friction element 12 such that torque is created between the friction element 12 and the pintle 18 for allowing the friction element 12 to be held in an infinitely variable angular position with respect to the pintle 18.

The prior art hinge assembly shown in FIGS. 1 and 2 is characterized by a relatively short performance life. The hinge assembly 10 suffers significant design limitations since the internal surface 14 of the friction element 12 only contacts the pintle 18 in three small sectors along the external surface 20 of the pintle 18. Because all of the forces transferred between the friction element 12 and pintle 18 are highly localized (as depicted by force vectors 22), there is significant pressure created at the contact areas which causes the hinge assembly to fatigue and have a loss of torque after a relatively short period of time. That is, the ability to control the angular position of the friction element 12 with respect

2 to the pintle 18 is quickly reduced to the point where the relative angular positions cannot be controlled.

The highly localized forces are created because the outside diameter of the pintle 18 is greater than or equal to the inside diameter of the cavity 16 of the friction element 12 to create an interference fit between the friction element 12 and pintle 18. When the pintle 18 is inserted within the cavity 16, the friction element 12 bends in a non-uniform manner to accommodate the pintle 18. As a result of the non-uniform bending, gaps 24 are created between the internal surface 14 of the friction element 12 and the external surface 20 of the pintle 18. Further, the bending also results in highly localized forces applied across the top of the friction element 12 and slightly smaller forces being applied on opposite sides of the pintle 18 along the lower edge of the friction element 12. The direction and location of the forces are depicted by the force vectors 22a, 22b shown in FIG. 2. The length of the force vectors 22a, 22b are depicted in accordance with the magnitude of the forces actually applied between the friction element 12 and the pintle 18.

Furthermore, the hinge assembly 10 shown in FIGS. 1 and 2 does not include any means for retaining lubricant between the friction element 12 and the pintle 18 during operation. In general, lubricant is gradually forced out from between the internal surface 14 of the friction element 12 and the external surface 20 of the pintle 18 by the regular, repeated, clockwise and counterclockwise motions of the hinge assembly 10. This contributes to the relatively short hinge life and to noise being generated in the hinge assembly 10 after a sufficient amount of lubricant has been forced out from between the friction element 12 and pintle 18.

The present invention overcomes many of the disadvantages inherent in the conventional hinge assembly 10 by providing a friction element which creates uniform forces between the external surface of the pintle and the internal surface of the friction element, thereby lowering the local pressures between the friction element and the pintle, increasing the operating life of the hinge assembly as well as providing for more efficient torque transfer, and ultimately, smaller size than prior art hinge assemblies. The hinge assembly of the present invention further includes areas for retaining lubrication between the pintle 18 and friction element 12 to further increase the operating life of the hinge assembly. This improvement also contributes to the relatively long operating life of the invention, as compared to prior art hinge assemblies.

SUMMARY OF THE INVENTION

In the present embodiment, the invention is a hinge assembly for rotatably coupling a first member to a second member. The assembly has a friction element for being secured to the first member. The friction element includes an internal surface which defines a generally cylindrical cavity. The friction element is geometrically configured to have substantially uniform strength. A generally cylindrical pintle for being secured to the second member includes an external surface. The pintle is positioned within the cavity with the external surface of the pintle in facing frictional engagement with the internal surface of the friction element, creating substantially uniform forces between the external surface of the pintle and the internal surface of the friction element to provide torque transfer and angular positional control of the pintle with respect to the friction element.

In another embodiment, the hinge assembly has a friction element for being secured to the first member. The friction element includes a clamping member which has an internal surface defining a cavity and a bearing member complementarily positioned and fixed within the cavity. The bearing member has an internal surface defining a generally cylindrical cavity. The clamping member is geometrically configured to have substantially uniform strength. The assembly also includes a generally cylindrical pintle for being secured to the second member. The pintle includes an external surface. The pintle is positioned within the cavity of the bearing member with the external surface of the pintle in facing frictional engagement with the internal surface of the bearing member whereby substantially uniform forces are created between the external surface of the pintle and the internal surface of the bearing member to provide torque transfer and angular positional control of the pintle with respect to the friction element.

In yet another embodiment, the hinge assembly comprises a housing for being secured to the first member. The housing includes an internal surface which defines a generally cylindrical cavity. The assembly further includes a friction element for being secured to the second member and includes a generally cylindrical external surface. The friction element is positioned within the cavity with the external surface of the friction element being in facing frictional engagement with the internal surface of the housing. The friction element is geometrically configured to have substantially uniform strength whereby substantially uniform forces are created between the external surface of the friction element and the internal surface of the housing to provide torque transfer and angular positional control of the friction element with respect to the housing.

BRIEF DESCRIPTION OF THE DRAWINGS

The foregoing summary, as well as the following detailed description of the embodiments of the invention will be better understood when read in conjunction with the appended drawings. For the purpose of illustrating the invention, there is shown in the drawings, embodiments which are presently preferred. It should be understood, however, that the present invention is not limited to the particular arrangement and instrumentalities shown. In the drawings:

FIG. 1 is a right-side elevational view of a conventional hinge assembly;

FIG. 2 is a cross-sectional view of the conventional hinge assembly shown in FIG. 1 taken along lines 2—2 of FIG. 1;

FIG. 3 is a right-side elevational view of a hinge assembly in accordance with a first preferred embodiment of the present invention;

FIG. 4 is a cross-sectional view of the hinge assembly shown in FIG. 3 taken along lines 4—4 of FIG. 3;

FIG. 5 is a right-side elevational view of an partially fabricated friction element used in the hinge assembly shown in FIG. 3;

FIG. 6 is a top plan view of the friction element shown in FIG. 5;

DETAILED DESCRIPTION OF THE PREFERRED EMBODIMENTS

Figure 7:
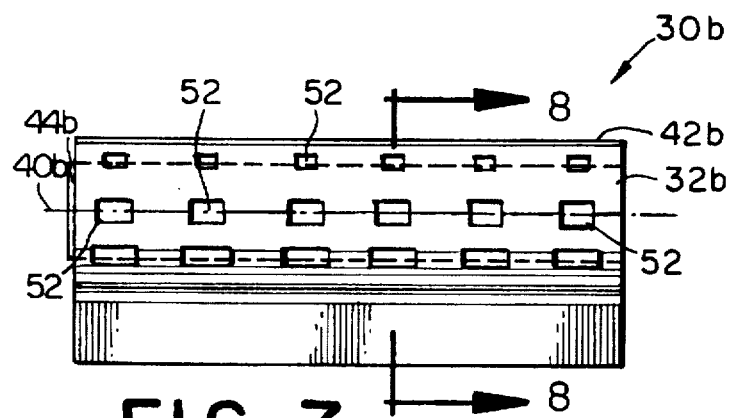
FIG. 7 is a right-side elevational view of a hinge assembly in accordance with a second preferred embodiment of the present invention.

Certain terminology is used in the following description for convenience only, and is not limiting. The words "right," "left", "lower" and "upper" designate directions in the drawings to which reference is made. The words "inwardly" and "outwardly" refer to directions toward and away from, respectively, the geometric center of the hinge assembly and designated parts thereof. The terminology includes the words above specifically mentioned, derivatives thereof and words of similar import.

Referring to the drawings in detail, wherein like numerals indicate like elements throughout, there is shown in FIGS. 3–6 a first preferred embodiment of a hinge assembly, generally designated 30a, for rotatably coupling a first member (not shown) to a second member (not shown) in accordance with the present invention. The present invention is not limited to rotatably coupling any particular type of first member to a second member or to any particular method of securing the first and second members to the hinge assembly since such information is well within the skill level of the ordinarily skilled artisan. As mentioned above, an example of such first and second members includes the base and screen, respectively, of a laptop, notebook or palmtop computer. Thus, it is understood by those skilled in the art that the hinge assembly of the present invention can be used to rotatably couple any two members as desired by the user.

Referring now to FIG. 3, the first hinge assembly 30a includes a friction element 32a for being secured to the first member. The friction element 32a includes an internal surface 34a. As best shown in FIG. 4, the internal surface 34a of the friction element 32a defines a generally cylindrical cavity 36a having a first diameter.

Referring now to FIG. 4, the friction element 32a is geometrically configured to have substantially uniform strength. An element having uniform strength so varies in cross section that the unit stress "S" remains constant, and "I/c" varies as "M". Wherein S is defined as the unit normal stress, I/c is defined as the section modulus and M is the bending moment. The bending moment at any section is the algebraic sum of the external forces and moments acting on the beam on one side of the section. Eugene A. Avallone et al., *Marks'Standard Handbook for Mechanical Engineers*, at 5–22 and 5–36 (9th ed. 1987).

In the first preferred embodiment, the friction element 32a is generally in the form of a question mark in cross section. That is, the friction element 32a includes a barrel or knuckle portion 32a' and a leg or leaf 32a" extending therefrom for being connected to the first member.

The friction element 32a is geometrically configured to have uniform strength by providing grooves 38a in the internal surface 34a of the friction element 32a. The grooves 38a provide the friction element 32a with a cross section which results in the unit stress S remaining constant, and I/c varying as M. As shown in FIG. 4, the grooves 38a are symmetrically positioned about a longitudinal axis 40a of the friction element 32a, have varying depths and widths and extend the length of the friction element 32a.

In the first preferred embodiment, it is preferred that four grooves 38a be symmetrically positioned on opposite sides of the longitudinal axis 40a. The lower grooves have a predetermined width and depth. The width and depth of the upper grooves become smaller in a stepped manner, as best shown in FIG. 4. The grooves 38a are preferably generally in the form of a U-shaped channel in cross section prior to bending the friction element from the generally flat configuration in FIG. 5 to the configuration shown in FIG. 4.

It is understood by those skilled in the art that the present invention is not limited to any particular formation of the grooves 38a. For instance, the grooves 38a could be generally semi-circular, V-shaped or U-shaped in cross section, without departing from the spirit and scope of the invention. Furthermore, it is also understood by those skilled in the art that the friction element 32a can be configured in any manner so long as it has uniform strength. Other embodiments of friction elements having uniform strength are described hereinafter. However, it is understood by those skilled in the art that other geometrical configurations could be developed which would yield a friction element having uniform strength.

As best shown in FIG. 4, the friction element 32a further includes an external surface 42a positioned radially outwardly of the internal surface 34a a uniform distance. Thus, the knuckle 32a' of the friction element 32a is generally annularly shaped in cross section.

As shown in FIGS. 5 and 6, the friction element 32a has grooves 38a formed in an upper surface of a plate or flat pattern 33. The upper surface becomes the internal surface 34a of the friction element 32a when the plate 33 is bent to the configuration shown in FIG. 4. The plate 33 is bent to the configuration shown in FIG. 4 by using standard machining and metal working tooling well understood by those skilled in the art.

Referring now to FIG. 4, the first hinge assembly 30a further includes a generally cylindrical pintle 44a for being secured to the second member. The pintle 44a includes an external surface 46a and is positioned within the cavity 36a with the external surface 42a of the pintle 44a in facing frictional engagement with the internal surface 34a of the friction element 32a such that substantially uniform forces are created between the external surface 46a of the pintle and the internal surface 34a of the friction element 32a to provide torque transfer and angular positional control of the pintle 44a with respect to the friction element 32a.

As shown in FIG. 4, the external surface 46a of the pintle 44a defines a second diameter. The second diameter is greater than or equal to the first diameter of the cavity 36a such that the pintle 44a is positioned within the cavity 36a with an interference fit. With the conventional friction element 12 of non-uniform strength, the interference fit results in highly localized forces, as shown by the force vectors 22 in FIG. 2. That is, the friction element 12 bends in a non-uniform manner to accommodate the larger pintle 18 which results in the gaps 24 being created between the friction element 12 and the pintle 18. The friction element 32a of the present invention includes grooves 38a, which give the friction element 32a uniform strength. As a result, the friction element 32a bends evenly and uniformly about the pintle 44a and achieves substantial facing frictional engagement (i.e., without gaps) between the external surface 46a of the pintle 44a and the internal surface 34a of the cavity 36a such that the forces between the friction element 32a and pintle 44a are evenly distributed throughout the contact area. This is depicted by the force vectors 48 which are of uniform length and are evenly spaced about the first hinge assembly 30a.

In the first hinge assembly 30a, the friction element 32a is preferably constructed from spring steel while the pintle 44a is preferably constructed of a high-strength steel. However, it is understood by those skilled in the art that the present invention is not limited to constructing the friction element 32a or pintle 44a of any particular material. For instance, the friction element 32a and pintle 44a could be constructed of stainless steel or zinc alloy or engineered plastics without departing from the spirit and scope of the invention.

Referring now to FIG. 4, the first hinge assembly 30a further includes a lubricant 50 positioned within the grooves 38a. The lubricant 50 is retained within the grooves 38a during operation of the first hinge assembly 30a to increase the life span of the first hinge assembly 30a. In the first embodiment, the lubricant 50 is preferably grease. However, it is understood by those skilled in the art that other types of lubricant can be positioned within the grooves 38a, such as solid or liquid lubricants.

Figure 8:
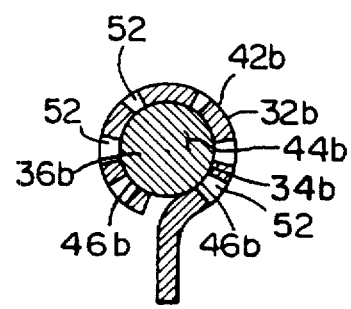
FIG. 8 is a cross-sectional view of the hinge assembly shown in FIG. 7 taken along lines 8—8 of FIG. 7.

Referring now to FIGS. 7 and 8, there is shown a second preferred embodiment of a second hinge assembly 30b. The second hinge assembly 30b is generally identical to the first hinge assembly 30a except that the friction element 32b of the second hinge assembly 30b, while having uniform strength, has a different geometrical configuration than the geometrical configuration of the friction element 32a of the first hinge assembly 30a, as described in more detail hereinafter.

The reference numerals used to identify the elements of the second hinge assembly 30b correspond to the reference numerals used to identify the elements of the first hinge assembly 30a, except that the suffix "b" is used. Similar terminology is used throughout the specification and drawings for purposes of brevity and convenience only, and is not limiting. The element numerals in the drawings which are not specifically referred to herein correspond to like elements described earlier in the specification.

The geometrical configuration of the friction element 32b of the second hinge assembly 30b, comprises an external surface 42b positioned radially outwardly of the internal surface 34b and a plurality of apertures 52 extending between the internal and external surfaces 34b, 42b of the friction element 32b. Three sets of apertures 52 are symmetrically positioned on opposite sides of the longitudinal axis 40b. As shown in FIG. 7, the apertures 52 are generally in the form of a parallelogram in plan view. The apertures 52 are preferably generally evenly spaced along the longitudinal axis 40b and across the entire length of the friction element 32b. The cross-sectional area of the apertures 52 closer to the bottom of the friction element 32b is greater than the cross-sectional area of the apertures 52 closer to the top of the friction element 32b. More particularly, the apertures 52 decrease in cross-sectional area in a stepped manner from the bottom to the top of the friction element 32b. Thus, the friction element 32b has a greater mass at its top than at its bottom.

While in the present embodiment, it is preferred that the apertures 52 be generally in the form of a parallelogram in plan view and be symmetrically positioned about the longitudinal axis 40b of the friction element 32b, it is understood by those skilled in the art that the particular orientation, shape and size of the apertures 52 is not pertinent to the present invention, and that any size, shape, number and orientation of apertures 52 can be used so long as the friction element 32b has uniform strength.

Figure 9:
FIG. 9 is a right-side elevational view of a hinge assembly in accordance with a third preferred embodiment of the present invention.
Figure 10:
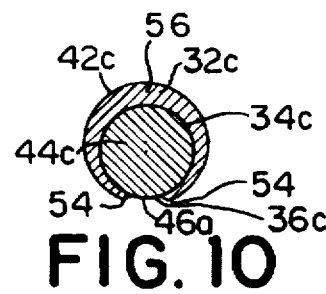
FIG. 10 is a cross-sectional view of the hinge assembly shown in FIG. 9 taken along lines 10—10 of FIG. 9.

Referring now to FIGS. 9 and 10, there is shown a third hinge assembly 30c in accordance with a third preferred embodiment of the present invention. The third hinge assembly 30c is generally identical to the first hinge assembly 30a except that the geometrical configuration of the friction element 32c, while having uniform strength, is different from the geometrical configuration of the friction element 32a of the first hinge assembly 30a. More particularly, the geometrical configuration of the friction element 32c comprises an external surface 42c positioned radially outwardly of the internal surface 34c a varying distance and the friction element 32c is generally C-shaped in cross section, as opposed to being in the form of a question mark in cross section. That is, the external surface 42c is preferably positioned radially outwardly of the internal surface 34c a varying distance such that the friction element 32c is generally in the form of a crescent in cross section. Thus, the friction element 32c defines a pair of lateral edges 54 and a middle portion 56 equidistantly positioned between the lateral edges 54. The distance between the internal and external surfaces 34c, 42c is greater at the middle portion 56 than the lateral edges 54 to thereby yield the crescent shape.

Figure 11:
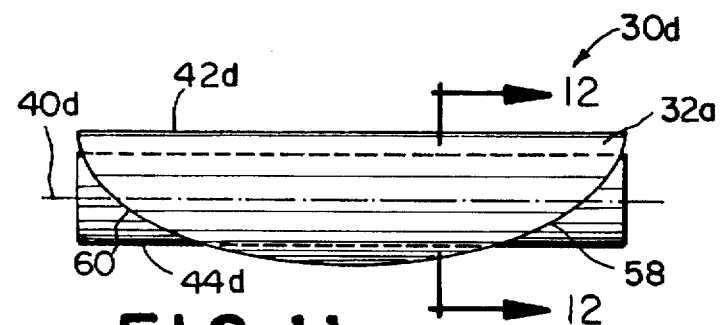
FIG. 11 is a right-side elevational view of a hinge assembly in accordance with a fourth preferred embodiment of the present invention.
Figure 12:
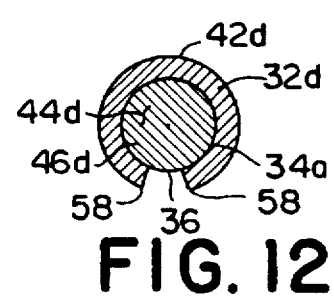
FIG. 12 is a cross-sectional view of the hinge assembly shown in FIG. 11 taken along lines 12—12 of FIG. 11.

Referring now to FIGS. 11 and 12, there is shown a fourth hinge assembly 30d in accordance with a fourth preferred embodiment of the invention. The fourth hinge assembly 30d is generally identical to the first hinge assembly 30a except that the geometrical configuration of the friction element 32d, while having uniform strength, is different from the geometrical configuration of the friction element 32a of the first hinge assembly 30a. In the fourth hinge assembly 30d, the frictional elements 32d and the pintle 44d have a common longitudinal axis 40d. The frictional element 32d of the fourth hinge assembly 30d includes first and second longitudinal edges 58, 60, respectively, spaced along the longitudinal axis 40d. The frictional element 32d is geometrically configured to have uniform strength by varying the distance between the first and second edges 58, 60 along the longitudinal axis. This results in the first and second edges 58, 60 being generally arcuate, as best shown in FIG. 11.

Figure 13:
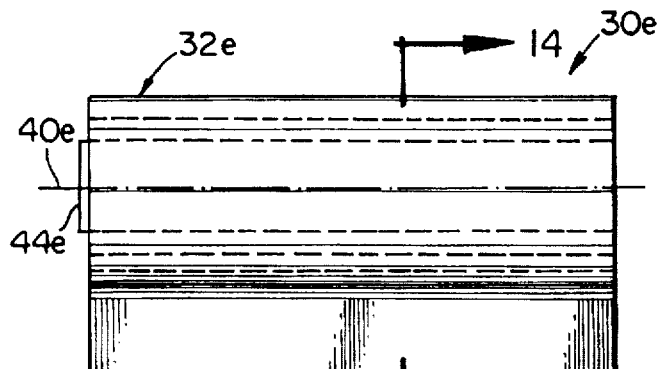
FIG. 13 is a right-side elevational view of a hinge assembly in accordance with a fifth preferred embodiment of the present invention.
Figure 14:
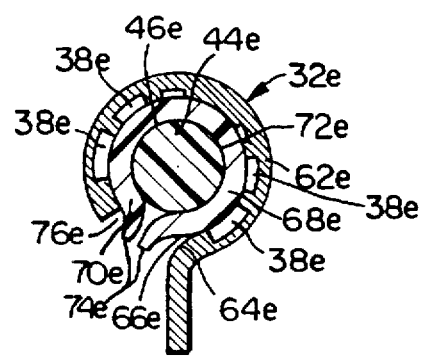
FIG. 14 is a cross-sectional view of the hinge assembly shown in FIG. 13 taken along lines 14—14 of FIG. 13.

Referring now to FIGS. 13 and 14, there is shown a fifth hinge assembly 30e in accordance with a fifth preferred embodiment of the present invention. In the fifth hinge assembly 30e, the friction element 32e includes a clamping member 62e having an internal surface 64e defining a cavity 66e and a bearing member 68e complementarily positioned and fixed within the cavity 66e. The bearing member 68e has an internal surface 70e defining a second generally cylindrical cavity 72e. The clamping member 62e is geometrically configured to have substantially uniform strength. The fifth hinge assembly 30e is similar in concept to the first hinge assembly 30a in that the clamping member 62e and friction element 32a are generally identical. However, the pintle 44e and bearing member 68e are preferably constructed of a polymeric material, such as glass reinforced polyamide.

The bearing member 68e includes a pair of lateral edges 74e which extend outwardly through the gap 76e of the clamping member 62e to rotationally lock the bearing member 68e to the clamping member 62e. The bearing member 68e is positioned within the cavity 66e and the pintle 44e is positioned within the second cavity 72e with an interference fit. As a result, the clamping and bearing members 62e, 68e bend evenly and uniformly about the pintle 44e and achieves substantial facing frictional engagement (i.e., without gaps) between the external surface 46e of the pintle 44e and the internal surface 70e of the cavity 72e such that the forces between the friction element 32e and pintle 44e are evenly distributed throughout the contact area. As such, the uniform forces applied by the clamping member 62e are transferred through the bearing member 68e to the pintle 44e.

Figure 15:
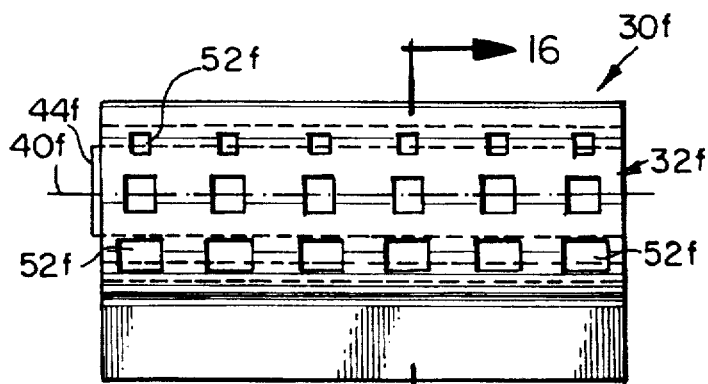
FIG. 15 is a right-side elevational view of a hinge assembly in accordance with a sixth preferred embodiment of the present invention.
Figure 16:
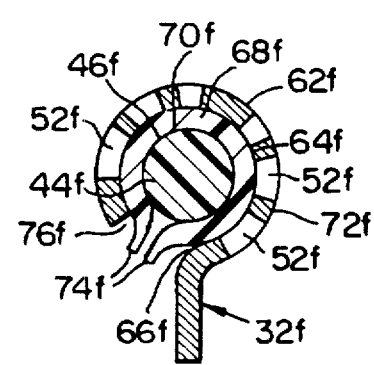
FIG. 16 is a cross-sectional view of the hinge assembly shown in FIG. 15 taken along lines 16—16 of FIG. 15.

Referring now to FIGS. 15 and 16, there is shown a sixth hinge assembly 30f in accordance with a sixth preferred embodiment of the invention. The sixth hinge assembly 30f is generally identical to the fifth hinge assembly 30e except that the clamping member 62e is configured in accordance with the friction element 32b used in the second hinge assembly 30b.

Figure 17:
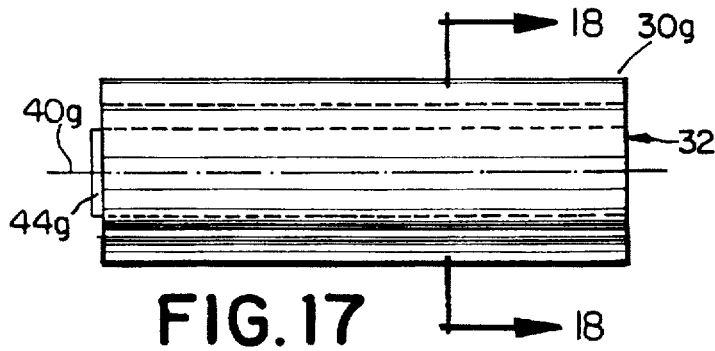
FIG. 17 is a right-side elevational view of a hinge assembly in accordance with a seventh preferred embodiment of the present invention.
Figure 18:
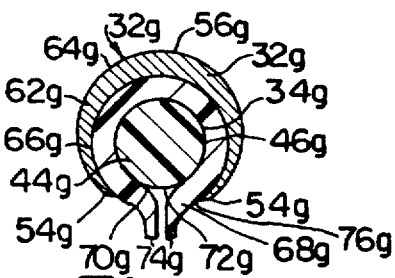
FIG. 18 is a cross-sectional view of the hinge assembly shown in FIG. 17 taken along lines 18—18 of FIG. 17.

Referring now to FIGS. 17 and 18, there is shown a seventh hinge assembly 30g in accordance with a seventh preferred embodiment of the invention. The seventh hinge assembly 30g is generally identical to the fifth hinge assembly 30e except that the clamping member 62e is in the form of the friction element 32c of the third hinge assembly 30c.

Figure 19:
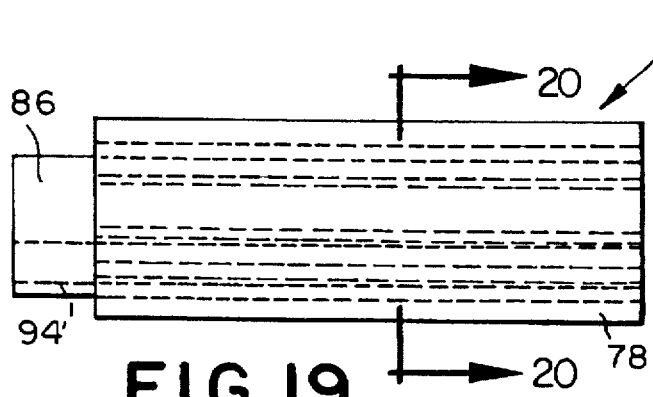
FIG. 19 is a right-side elevational view of a hinge assembly in accordance with an eighth preferred embodiment of the present invention.
Figure 20:
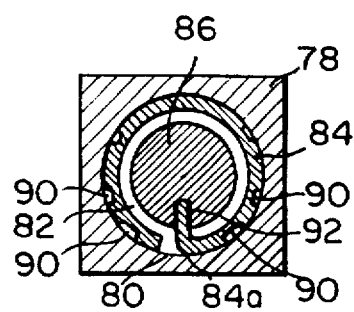
FIG. 20 is a cross-sectional view of the hinge assembly shown in FIG. 19 taken along lines 20—20 of FIG. 19.
Figure 21:
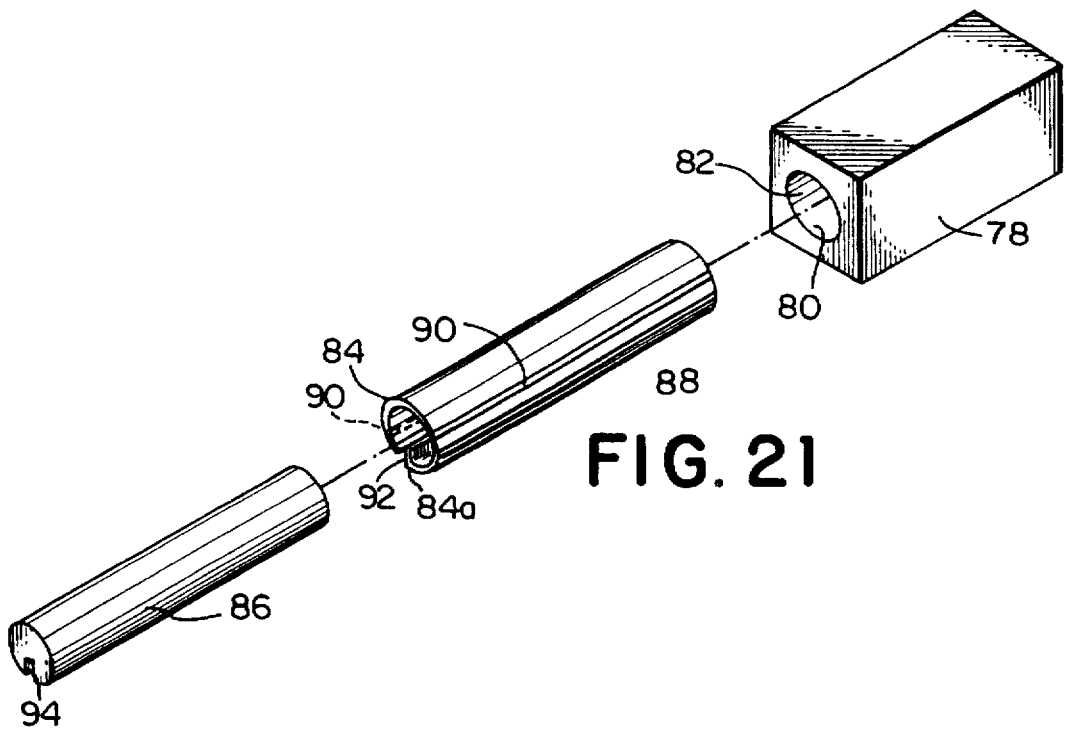
FIG. 21 is an exploded perspective view of the hinge assembly shown in FIG. 19.

Referring now to FIGS. 19, 20 and 21, there is shown an eighth hinge assembly 30h, in accordance with an eighth preferred embodiment, for rotatably coupling a first member (not shown) to a second member 86. The eighth hinge assembly 30h includes a housing 78 for being secured to the first member. The housing 78 includes an internal surface 80 defining a generally cylindrical cavity 82. As shown in FIGS. 20 and 21, the housing is generally in the form of a parallelepiped. However, it is understood by those skilled in the art that the present invention is not limited to constructing the housing 78 in any particular geometrical configuration so long as the generally cylindrical cavity 82 is included.

The eighth hinge assembly 30h includes a friction element 84 for being secured to the second member 86. The friction element 84 is generally cylindrically shaped to provide a generally cylindrical external surface 88. More particularly, the friction element 84 is generally hollow such that the friction element 84 is generally annular shaped in cross section. The friction element 84 is positioned within the cavity 82 with the external surface 88 of the friction element 84 being in facing frictional engagement with the internal surface 80 of the housing 78.

As best shown in FIG. 20, the friction element 84 is geometrically configured to have substantially uniform strength such that substantially uniform forces are created between the external surface 88 of the friction element 84 and the internal surface 80 of the housing 78 to provide torque transfer and angular positional control of the friction element 84 with respect to the housing 78. In the eighth preferred embodiment, the geometrical configuration of the friction element 84 comprises forming grooves 90 in the external surface of the friction element 84, as discussed above in connection with the first hinge assembly 30a. That is, the grooves 90 are similar to the grooves 38a of the first hinge assembly 30a, accordingly, further description thereof is omitted for purposes of convenience only.

In the present embodiment, it is preferred that the internal surface 80 of the housing 78 define a first diameter and the external surface 88 of the friction element 84 define a second diameter. It is preferred that the second diameter be greater than or equal to the first diameter such that the friction element 84 is positioned within the cavity 82 with an interference fit. The interference fit causes the friction element 84 to bend or contract inwardly when it is positioned within the cavity 82. The bending is uniform throughout the cross section of the friction element 84 such that the external surface 88 of the friction element 84 is in facing frictional engagement with the internal surface 80 of the housing 78.

As best shown in FIGS. 20 and 21, a lateral edge 84a of the friction element 84 includes a radially inwardly extending leaf 92. The second member 86 is generally cylindrically shaped and includes an external diameter which is less than the internal diameter of the friction element 84. The second member 86 further includes a slot 94 for complementarily receiving the leaf 92 such that rotation of the second member 86 causes rotation of the friction element 84.

The friction element 84 and housing 78 are preferably constructed of the same material as the first element 32a and pintle 44a of the first hinge assembly 30a. Further, lubricant (not shown) can be positioned within the grooves 90 to increase the life of the eighth hinge assembly 30h, as discussed above in connection with the first hinge assembly 30a.

In use, with respect to the first hinge assembly 30a, the friction element 32a is rotated with respect to the pintle 44a. The internal surface 34a of the friction element 32a is in substantial facing frictional engagement with the external surface 42a of the pintle 44a. Thus, the contact area between the friction element 32a and pintle 44a is maximized and the pressure between the internal surface 34a of the friction element 32a and the external surface 46a of the pintle 44a is relatively low, which in turn promotes reduced wear and higher torques for the same axial length of similar nonuniform strength frictional elements.

The foregoing description of the use of the first hinge assembly 30a, is equally applicable to the use of the second through eighth hinge assemblies 30b–30h, therefore, further description thereof is omitted for purposes of convenience only, and is not limiting.

While it is preferred that the friction element have uniform strength, it is understood by those skilled in the art that the friction element may not have substantially uniform strength and achieve some of the advantages of the present invention. For instance, a series of grooves could be formed in the internal surface of the friction element for receiving and retaining a lubricant without the friction element having uniform strength. Such a hinge assembly would have a longer life than the prior art hinge assemblies, but not as long a life if the friction element was configured to have uniform strength. Similarly, the friction element could include a plurality of apertures, but not have uniform strength.

From the foregoing description, it can be seen that the present invention comprises a hinge assembly which includes an element of substantially uniform strength such that substantially uniform surfaces are created between the elements of the hinge assembly. It will be appreciated by those skilled in the art that changes and modifications can be made to the above-described embodiment without departing from the inventive concept thereof. It is understood, therefore, that the present invention is not limited to the particular embodiments disclosed, but is intended to include all modifications and changes which are within the scope and spirit of the invention as defined by the appended claims.

We claim:

1. A hinge assembly for rotatably coupling a first member to a second member, said assembly comprising:

a housing for being secured to said first member and having an internal surface, said internal surface defining a generally cylindrical cavity; and a friction element for being secured to the second member and including a generally cylindrical external surface, said friction element being positioned within said cavity with said external surface of said friction element being in facing frictional engagement with said internal surface of said housing, said friction element being geometrically configured to have substantially uniform strength whereby substantially uniform forces are created between said external surface of said friction element and said internal surface of said housing to provide torque transfer and angular positional control of said friction element with respect to said housing.

2. The hinge assembly as recited in claim 1 wherein said internal surface of said housing defines a first diameter and said external surface of said friction element defines a second diameter, said second diameter being greater than or equal to said first diameter such that said friction element is positioned within said cavity with an interference fit.

3. The hinge assembly as recited in claim 1 wherein said geometrical configuration of said friction element comprises grooves in said external surface of said friction element.

4. The hinge assembly as recited in claim 3 wherein said grooves are symmetrically positioned about a longitudinal axis of said housing.

5. The hinge assembly as recited in claim 4 wherein said grooves have varying depths.

6. The hinge assembly as recited in claim 5 further including a lubricant positioned within said grooves for increasing the life span of the hinge assembly.

7. A hinge assembly for rotatably coupling a first member to a second member, said assembly comprising:

a friction element for being secured to said first member and having an internal surface and an external surface positioned radially outwardly of said internal surface, said internal surface defining a generally cylindrical cavity, said friction element including a plurality of apertures extending between said internal and external surfaces; and a generally cylindrical pintle for being secured to the second member and including an external surface, said pintle being positioned within said cavity with said external surface of said pintle being in facing frictional engagement with said internal surface of said friction element whereby substantially uniform forces are created between said external surface of said pintle and said internal surface of said friction element to provide torque transfer and angular positional control of said pintle with respect to said friction element.

8. A hinge assembly for rotatably coupling a first member to a second member, said assembly comprising:

a housing for being secured to said first member and having an internal surface, said internal surface defining a generally cylindrical cavity; and a friction element for being secured to the second member and including a generally cylindrical external surface, said friction element being positioned within said cavity with said external surface of said friction element being in facing frictional engagement with said internal surface of said housing, said friction element including grooves formed in said external surface whereby substantially uniform forces are created between said external surface of said friction element and said internal surface of said housing to provide torque transfer and angular positional control of said friction element with respect to said housing.

9. The hinge assembly as recited in claim 8 further including a lubricant positioned within said grooves for increasing the life span of the hinge assembly.

10. A hinge assembly for rotatably coupling a first member to a second member, said assembly comprising:

a friction element for being secured to said first member and having an internal surface, said internal surface defining a generally cylindrical cavity having a first diameter and a longitudinal axis, said friction element having a flat pattern with a length and a width, with width extending in a circumferential direction with respect to the cylindrical cavity; and a generally cylindrical pintle for being secured to the second member and including an external surface, said external surface of said pintle defining a second diameter, said second diameter being greater than or equal to said first diameter, said pintle being positioned within said cavity with an interference fit such that said external surface of said pintle is in facing frictional engagement with said internal surface of said friction element, said friction element having a cross sectional area per unit width which varies in accordance with the formula M=S(I/c) where M is the bending moment created by the interference fit of the pintle in the friction element, I/c is defined as the section modulus, and S is defined as the normal stress per unit width, where the cross sectional area per unit width is a function of I/c, such that S remains approximately constant around the circumference of the friction element.

11. The hinge assembly as recited in claim 10 wherein the internal surface of the friction element includes grooves which vary the cross sectional area per unit width of the friction element.

12. The hinge assembly as recited in claim 11 wherein said grooves are symmetrically positioned about the longitudinal axis of said friction element.

13. The hinge assembly as recited in claim 11 wherein the grooves have varying depths, varying widths, and varying angular positions.

14. The hinge assembly as recited in claim 11 wherein said grooves have varying depths.

15. The hinge assembly as recited in claim 10 wherein the friction element has an external surface, and wherein the friction element includes a plurality of apertures between the internal and external surfaces of the friction element to vary the cross sectional area per unit width of the friction element.

16. The hinge assembly as recited in claim 10 wherein the friction element includes an external surface positioned radially outwardly of said internal surface a varying distance to vary the cross sectional area per unit width of the friction element.

17. The hinge assembly as recited in claim 10 wherein said the friction element includes an external surface positioned radially outwardly of said internal surface, and first and second edges spaced along said axis, said first and second edges being spaced apart from each other a varying distance to vary the cross sectional area per unit width of the friction element.

18. The hinge assembly as recited in claim 10 wherein the friction element is C-shaped.

19. The hinge assembly of claim 10 wherein the friction element is question mark shaped.

20. A hinge assembly for rotatably coupling a first member to a second member, the assembly comprising:

a friction element for being secured to the first member and having an internal surface, the internal surface defining a generally cylindrical cavity having a first diameter, and a longitudinal axis, the friction element having a geometrical configuration which has substantially uniform strength in a direction normal to the longitudinal axis; and a generally cylindrical pintle for being secured to the second member and including an external surface, the external surface of the pintle defining a second diameter, the second diameter being greater than or equal to the first diameter, the pintle being positioned within the cavity with an interference fit with the external surface of the pintle in facing frictional engagement with the internal surface of the friction element such that the friction element evenly applies generally radially extending substantially uniform compressive forces to the pintle whereby the substantially uniform forces provide torque transfer and angular positional control of the pintle with respect to the friction element.

21. The hinge assembly as recited in claim 20 wherein the geometrical configuration of the friction element comprises grooves located in the internal surface of said friction element.

22. The hinge assembly as recited in claim 21 wherein said grooves are symmetrically positioned about the longitudinal axis of the friction element.

23. The hinge assembly as recited in claim 21 wherein the grooves have varying depths.

24. The hinge assembly as recited in claim 21 wherein the geometrical configuration of the friction element further comprises an external surface positioned radially outwardly of said internal surface a uniform distance.

25. The hinge assembly as recited in claim 21 further including a lubricant positioned within the grooves for increasing the life span of the hinge assembly.

26. The hinge assembly as recited in claim 20 wherein the geometrical configuration of the friction element comprises an external surface positioned radially outwardly of the internal surface and a plurality of apertures extending between the internal and external surfaces of the friction element.

27. The hinge assembly as recited in claim 20 wherein the geometrical configuration of the friction element comprises an external surface positioned radially outwardly of the internal surface a varying distance and the friction element is generally c-shaped in cross section.

28. The hinge assembly as recited in claim 20 wherein the friction element and the pintle have a common longitudinal axis, the geometrical configuration of the friction element further including an external surface positioned radially outwardly of the internal surface and first and second edges spaced along the axis, the first and second edges being spaced apart a varying distance.

* * * * *